United States Patent
Park et al.

(10) Patent No.: US 11,651,418 B2
(45) Date of Patent: *May 16, 2023

(54) SYSTEMS AND METHODS FOR ON-DEMAND DECOMPOSITION OF ORDERS AND URGENCY-BASED IDENTIFICATION OF ITEM COMBINATION FOR FULFILLMENT

(71) Applicant: COUPANG CORP., Seoul (KR)

(72) Inventors: Sung Jin Park, Seoul (KR); Chang Geun Jin, Seoul (KR); Lianxi Bai, Seoul (KR); Kyung Jae Lee, Seoul (KR); Chang Hyun Kim, Seoul (KR); Sang Ho Lee, Seoul (KR); Sang Hee Ahn, Seoul (KR); Hyeon Chang Baek, Seoul (KR); Sang Ho Yim, Seoul (KR); Seon Sook Hong, Seoul (KR); Kyeong Suk Jin, Seoul (KR); Seo Kyoung Leem, Incheon (KR); Eung Soo Lee, Kyunggido (KR)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,288

(22) Filed: Aug. 27, 2021

(65) Prior Publication Data

US 2022/0067817 A1    Mar. 3, 2022

Related U.S. Application Data

(63) Continuation of application No. 17/002,877, filed on Aug. 26, 2020, now Pat. No. 11,132,739.

(51) Int. Cl.
*G06Q 30/06* (2023.01)
*G06Q 30/0601* (2023.01)
(Continued)

(52) U.S. Cl.
CPC ..... *G06Q 30/0635* (2013.01); *G06Q 10/0832* (2013.01); *H04W 4/35* (2018.02); *H04W 4/80* (2018.02)

(58) Field of Classification Search
CPC . G06Q 30/0635; G06Q 10/0832; H04W 4/35; H04W 4/80
(Continued)

(56) References Cited

U.S. PATENT DOCUMENTS 10,421,542 B2    9/2019    Beckman et al.
10,565,555 B1    2/2020    Kim et al.
(Continued)

FOREIGN PATENT DOCUMENTS

CN    103632026 A    3/2014
CN    103942665 A    7/2014
(Continued)

OTHER PUBLICATIONS

International Search Report and Written Opinion for counterpart International Application No. PCT/IB2021/050637 dated May 26, 2021 (8 pages).
(Continued)

*Primary Examiner* — Ahshik Kim
(74) *Attorney, Agent, or Firm* — Finnegan, Henderson, Farabow, Garrett & Dunner LLP

(57) ABSTRACT

The systems and methods for receiving a user input for a combination of a plurality of object pointers, wherein the object pointers are associated with a corresponding plurality of items located within a first area; retrieving one or more system parameters comprising a current location and a current container; transmitting a request for the combination of the plurality of object pointers, the request comprising the one or more system parameters; receiving the combination of the plurality of object pointers in response to the request;

(Continued)

displaying locations of the plurality of items relative to the current location; and processing the plurality of items until a threshold capacity of the current container is reached by receiving input data corresponding to the plurality of object pointers.

20 Claims, 12 Drawing Sheets

(51) Int. Cl.
 *G06Q 10/0832* (2023.01)
 *H04W 4/80* (2018.01)
 *H04W 4/35* (2018.01)

(58) Field of Classification Search
 USPC ........................................ 705/26.81; 235/383
 See application file for complete search history.

(56) References Cited

U.S. PATENT DOCUMENTS

| | | | |
|---|---|---|---|
| 10,618,735 B1 | 4/2020 | Oh et al. | |
| 10,699,421 B1 | 6/2020 | Cherevatsky et al. | |
| 10,800,608 B1 | 10/2020 | Campbell et al. | |
| 11,132,739 B1 * | 9/2021 | Park | H04W 4/02 |
| 2013/0173489 A1 | 7/2013 | Gabrielson | |
| 2017/0046653 A1 | 2/2017 | Wilson et al. | |
| 2017/0286907 A1 | 10/2017 | Rizkallah et al. | |
| 2018/0268348 A1 | 9/2018 | Guan | |
| 2019/0318307 A1 | 10/2019 | Higashida et al. | |

FOREIGN PATENT DOCUMENTS

| | | |
|---|---|---|
| CN | 105512847 A | 4/2016 |
| CN | 108573423 A | 9/2018 |
| CN | 111033539 A | 4/2020 |
| CN | 111429049 A | 7/2020 |
| JP | 6649710 B2 | 2/2020 |
| KR | 10-2018-0073220 | 7/2018 |
| TW | 201617983 A | 5/2016 |

OTHER PUBLICATIONS

Notice of Preliminary Rejection dated Oct. 12, 2021, by the Korean Intellectual Property Office in counterpart Korean Application No. 10-2020-0177868, 9 pages.

Office Action dated Nov. 25, 2021, by the Taiwanese Intellectual Property Office in counterpart Taiwanese Application No. 11021156550, 4 pages.

Notice of Allowance in counterpart Taiwanese Application No. 110100039 dated Mar. 23, 2022 (3 pages).

Notice of Preliminary Rejection in counterpart Korean Application No. 10-2020-0177868 dated Apr. 19, 2022 (16 pages).

Examination Notice in counterpart Hong Kong Application No. 22021030796.7 dated May 27, 2022 (7 pages).

Notice of Final Rejection in counterpart Korean Application No. 10-2020-0177868 dated Aug. 23, 2022 (9 pages).

* cited by examiner login  Sign Up  Service center

Category | Cheese | ? | 🛒

My Orders  Shopping Cart all 'Cheese' (65,586)    Gift Cards filter

☐ Fast Delivery
☐ Imported Product 65,586 results for 'Cheese'
Related searches: Sliced cheese  baby cheese  cheddar cheese
string cheese  butter  pizza cheese  cream cheese  cheese stick
cubed cheese  parmesan cheese
                                                        6 per page category
All
Food
Silverware
Kitchen utensils
Home electronics digital
Household goods
  View more brands
  Local Milk
  Daily dairy
  Cattle and trees
View more scope
All stars
  4 or more
  3 or more
  2 or more
  1 or more

CHEDDAR

FREE Shipping
Sliced cheese, 18g,
100 pieces
(88 won per 10 g)
Morning (Thursday)

(1294)

LOCAL FARM MILK

Mozzarella cheese,
1kg, 2 pieces
🚀
(103 won per 10 g)
Tomorrow (Wed)

(285)

100 grams of cheddar
sliced cheese,
18 grams, 100 pieces
(73 won per 10 g)
Morning (Thursday)

(862)

REAL GRATED PARMESAN

Grated Parmesan
Cheese, 85g, 1 piece
🚀
(389 won per 10g)
Tomorrow (Wed)

(839)

Mozzarella cheese,
1 kg, 1
(85 won per 10g)
Morning (Thursday)

(379)

Cheese Heads String

FREE Shipping
1.36 kg of string
cheese
Morning (Thursday)

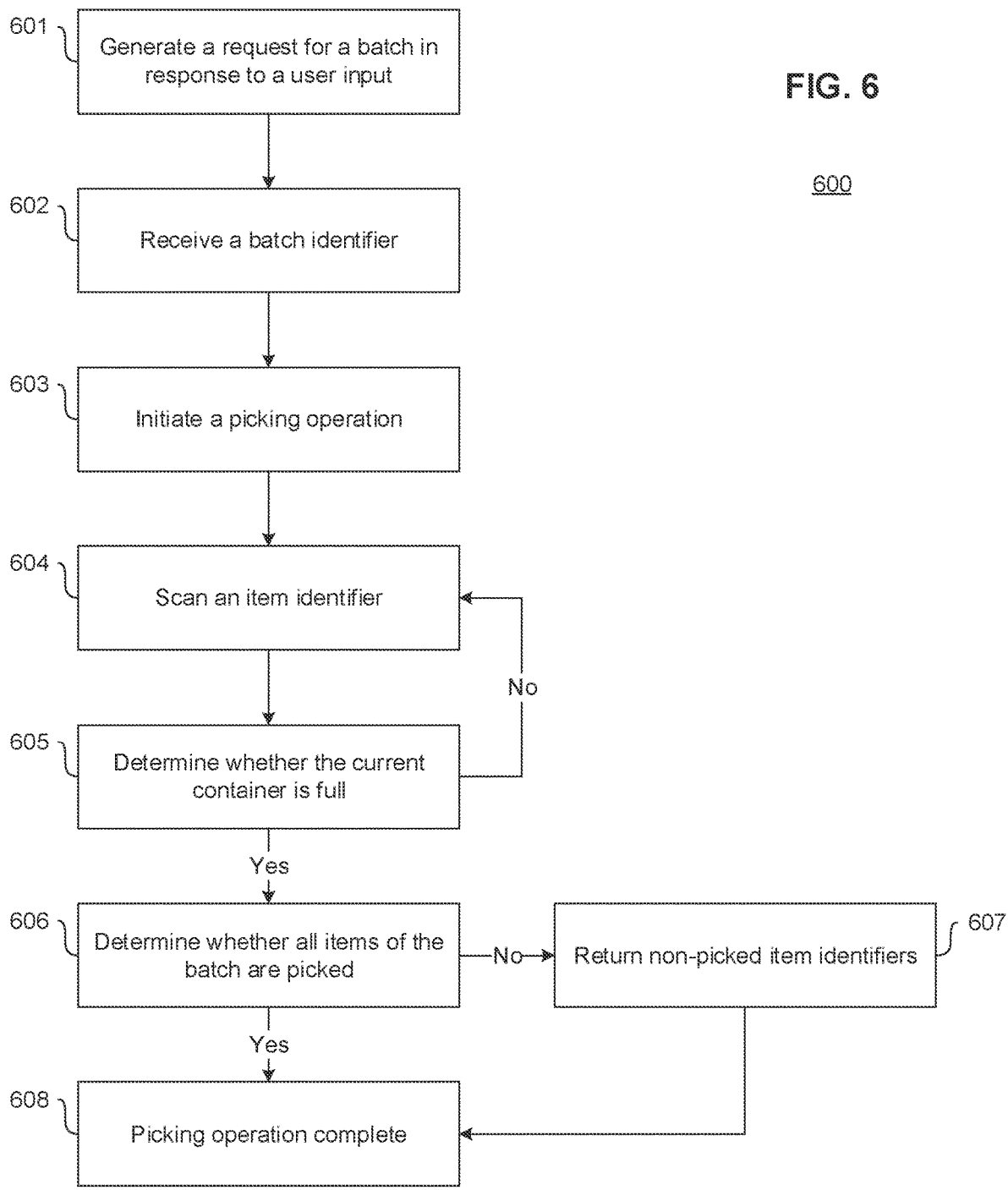

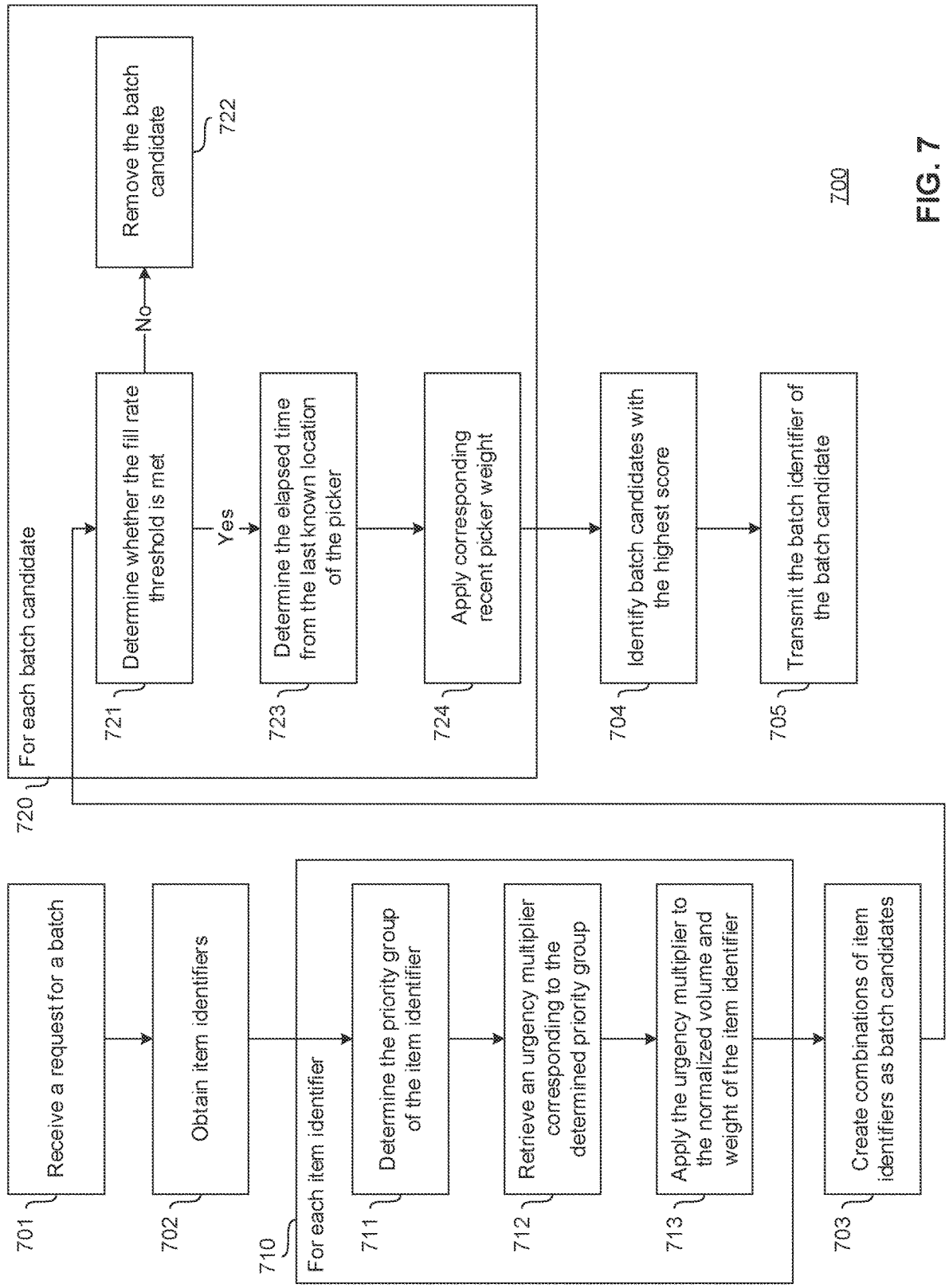

SYSTEMS AND METHODS FOR ON-DEMAND DECOMPOSITION OF ORDERS AND URGENCY-BASED IDENTIFICATION OF ITEM COMBINATION FOR FULFILLMENT

CROSS-REFERENCE TO RELATED APPLICATIONS

This application is a continuation of and claims the benefit of priority to U.S. application Ser. No. 17/002,877, filed Aug. 26, 2020 (now allowed), the contents of which are hereby incorporated herein by reference.

TECHNICAL FIELD

The present disclosure generally relates to computerized methods and systems for reorganizing customer orders in real time based on urgency and system configurations. In particular, embodiments of the present disclosure relate to inventive and unconventional systems that decompose the customer orders into individual items in response to a user request and regrouping the individual items into combinations for order fulfillment based on urgency and other system configurations.

BACKGROUND

With proliferation of the Internet, online shopping has become one of the major avenues of commerce. Consumers and businesses are purchasing goods from online vendors more frequently than ever, and the number of transactions and sales revenue are projected to grow year-over-year at a staggering rate. As the scope and volume of e-commerce continue to grow, both a number of different products available online and an average number of purchases made in a given period are growing exponentially. It has thus become very important to optimize processes of fulfilling an order, which starts when a customer places the order and ends when the order is delivered to the customer.

Of the different processes that are involved in order fulfillment such as retrieving items included in the order, packaging the items, and shipping, various solutions for retrieving the items already exist to make the process more efficient. The existing solutions, however, are rudimentary in that they control the retrievals on a per-order basis. That is, under existing solutions, workers are assigned one or more orders to fulfill, and they retrieve items until they complete retrieving every item in each order regardless of where the items may be located in a warehouse. Considering the numerosity of items and a typical size of a warehouse, the existing solutions may not be utilizing the workers' time and effort as much as they could. This is especially true when different items in an order are located far apart in a warehouse. Moreover, the workers in the existing solutions may not be aware of certain limitations in the overall system, where, for example, a conveyor belt may have certain weight limit or the items of an order are heavier or larger than one would expect. It is nearly impossible for individual workers to account for these limitations as the limit must be calculated based on all products that are in transport at a given point in time, and current systems are unable to account for these limitations as well.

Furthermore, even when some conventional systems are configured to assign orders to workers based on extra considerations such as the location of the items, the conventional systems are still inefficient in that they generate the assignments before receiving the workers' request for new assignments. Under this conventional configuration, items included in newly received orders must wait until the previously generated assignments are retrieved even if it would have been more efficient to retrieve the new items with the previous assignments.

Therefore, there is a need for improved system and methods for managing orders and assigning them to workers in a controlled manner to process the orders in an efficient manner.

SUMMARY

One aspect of the present disclosure is directed to a computer-implemented system for handling object pointers. The system may comprise a memory storing instructions; and at least one processor configured to execute the instructions. The instructions may comprise: receiving a user input for a combination of a plurality of object pointers, wherein the object pointers are associated with a corresponding plurality of items located within a first area; retrieving one or more system parameters comprising a current location and a current container; transmitting a request for the combination of the plurality of object pointers, the request comprising the one or more system parameters; receiving the combination of the plurality of object pointers in response to the request; displaying locations of the plurality of items relative to the current location; and processing the plurality of items until a threshold capacity of the current container is reached by receiving input data corresponding to the plurality of object pointers.

Yet another aspect of the present disclosure is directed to a computer-implemented method for handling object pointers. The method may comprise: receiving a user input for a combination of a plurality of object pointers, wherein the object pointers are associated with a corresponding plurality of items located within a first area; retrieving one or more system parameters comprising a current location and a current container; transmitting a request for the combination of the plurality of object pointers, the request comprising the one or more system parameters; receiving the combination of the plurality of object pointers in response to the request; displaying locations of the plurality of items relative to the current location; and processing the plurality of items until a threshold capacity of the current container is reached by receiving input data corresponding to the plurality of object pointers.

Still further, another aspect of the present disclosure is directed to a computer-implemented system for decomposition and reorganization of items in customer orders. The system may comprise a memory storing instructions; and at least one processor configured to execute the instructions. The instructions may comprise: receiving, from a user device, a request for a batch of one or more item identifiers, wherein the one or more item identifiers are associated with a subset of one or more customer orders; decomposing the one or more customer orders into individual item identifiers to be stored in a network-connected storage device; retrieving a plurality of item identifiers of available customer orders; identifying item identifiers associated with a priority group; creating a plurality of combinations of the identified item identifiers as batch candidates; identifying a batch candidate with a highest score, the score being based on locations of items associated with the item identifiers of the identified batch candidate; and transmitting the identified batch candidate to the user device.

Other systems, methods, and computer-readable media are also discussed herein.

BRIEF DESCRIPTION OF THE DRAWINGS

FIG. 1B depicts a sample Search Result Page (SRP) that includes one or more search results satisfying a search request along with interactive user interface elements, consistent with the disclosed embodiments.

FIG. 6 is a flow chart of an exemplary computerized process for a picking operation as performed by a worker with a mobile device, consistent with the disclosed embodiments.

FIG. 7 is a flow chart of an exemplary computerized process for generating a batch on-demand, consistent with the disclosed embodiments.

DETAILED DESCRIPTION

Figure 1A:
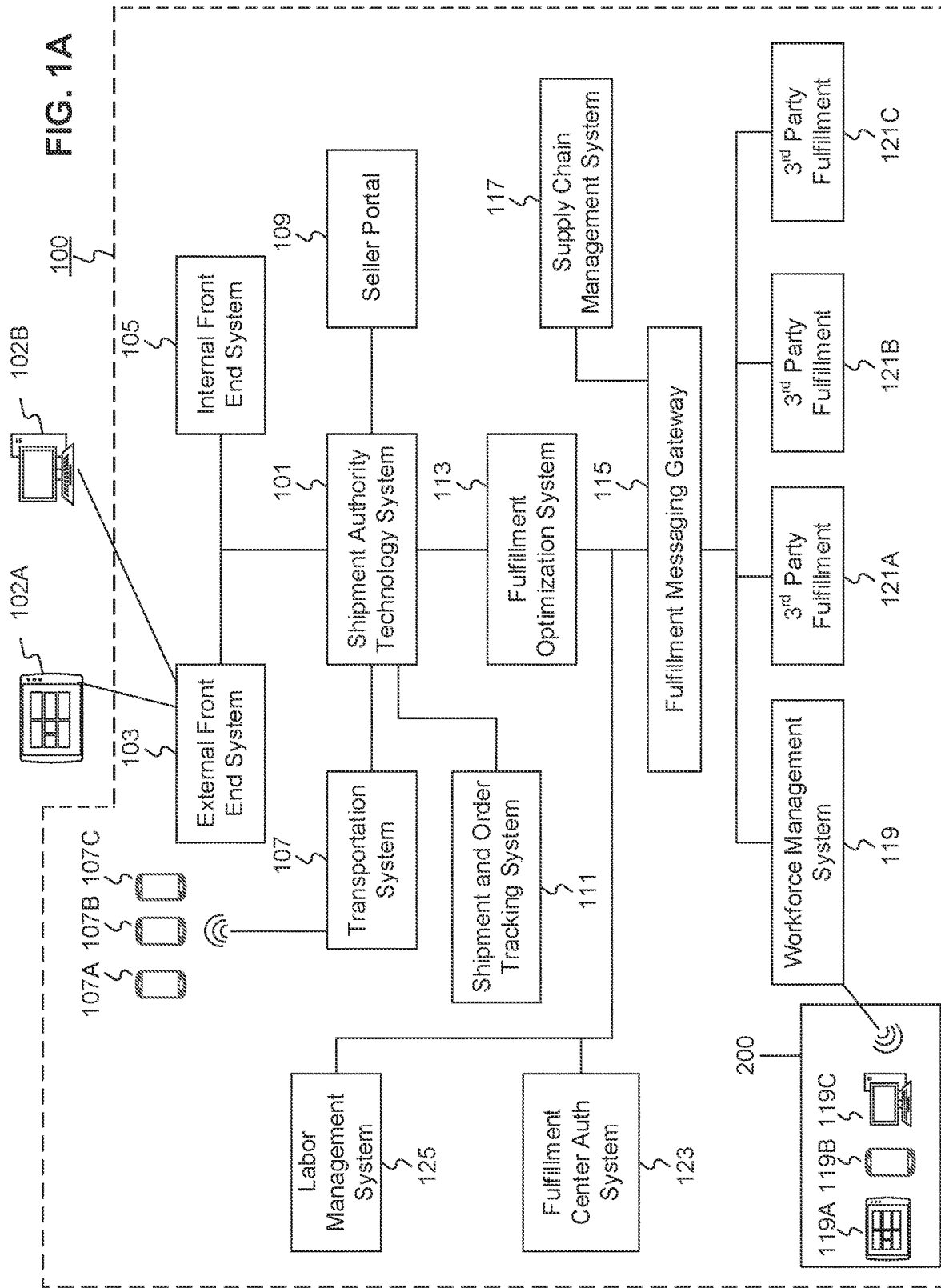
FIG. 1A is a schematic block diagram illustrating an exemplary embodiment of a network comprising computerized systems for communications enabling shipping, transportation, and logistics operations, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computer-implemented systems and methods for decomposing customer orders into individual items in response to a user request, regrouping the individual items into combinations based on urgency and other system configurations, and transmitting the best combination at the moment to the user for retrieval.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
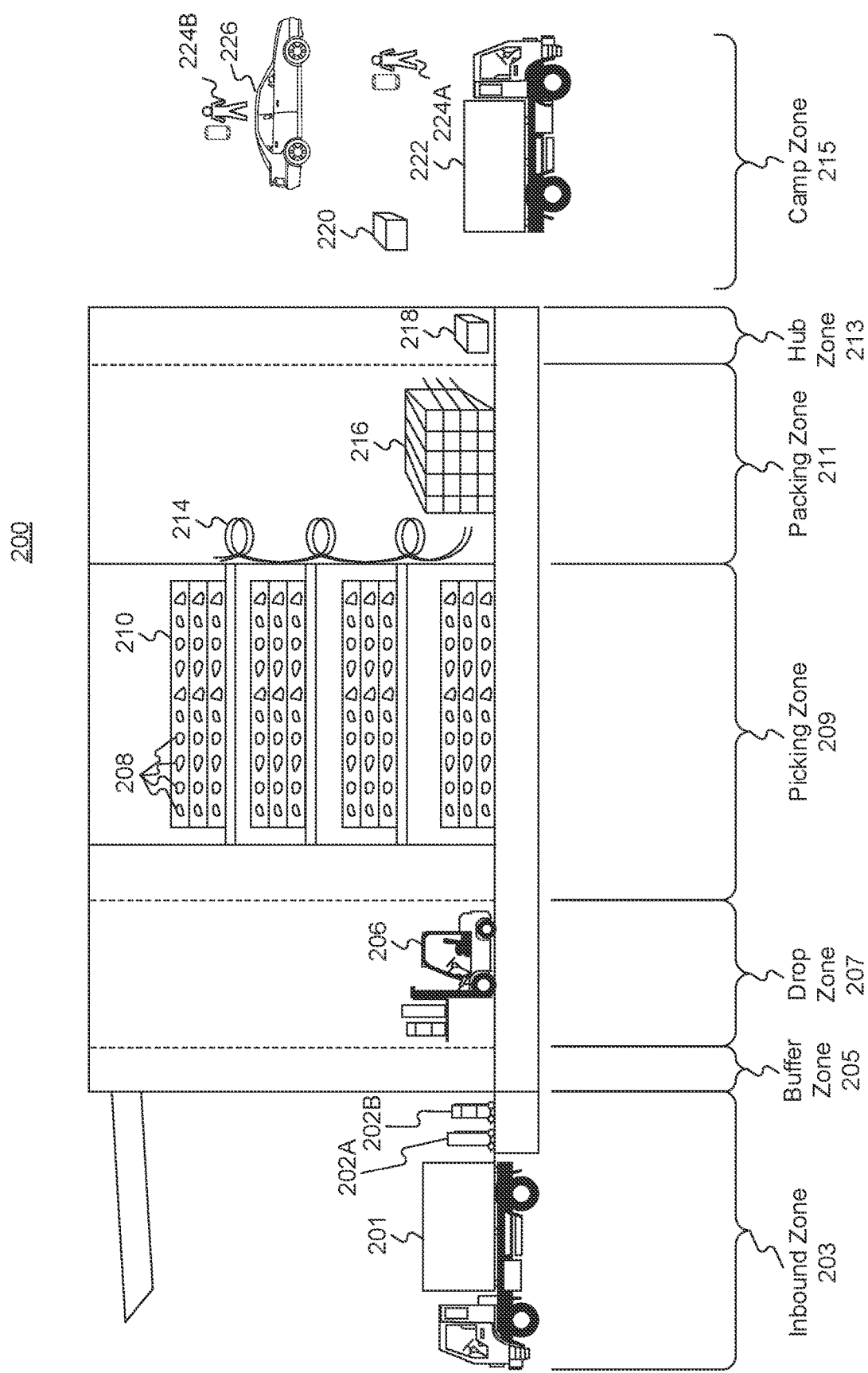
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
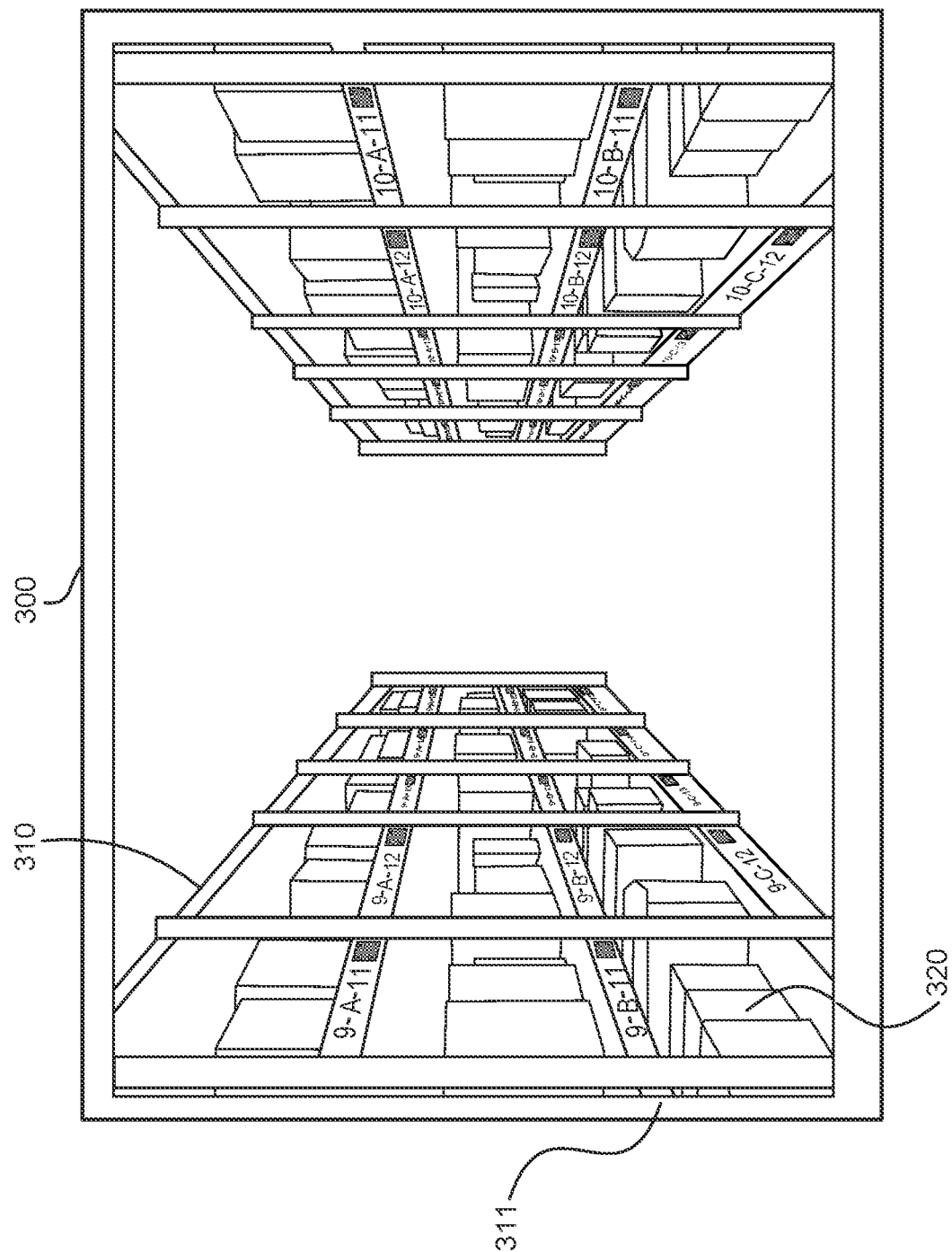
FIG. 3A is a diagrammatic illustration of an exemplary picking zone, consistent with the disclosed embodiments.

FIG. 3A is a diagrammatic illustration of an exemplary picking zone 300 that may serve a similar function as picking zone 209 of FIG. 2. Picking zone 300 may be located in a warehouse, such as FC 200. In picking zone 300, items 320 are stored in storage units 310, which may include one or more location identifiers 311. Storage units 310, in some embodiments, may be physical shelving, bookshelves, boxes, totes, refrigerators, freezers, cold stores, or the like. Items 320, in some embodiments, may be products for sale and may be picked by a user (such as a picker) or an automated machine, when a customer places an order for items 320 via a website hosted by external front end system 103.

In some embodiments, storage units 310, such as a shelving, may have location identifier 311 attached to it. Location identifier 311 may be a unique address of a particular location of storage units 310 within picking zone 300. In some embodiments, location identifier 311 may correspond to a particular item that is shelved at the location. In other embodiments, location identifier 311 may indicate multiple items that are shelved together or closely together. Location identifier 311 may be an item barcode, RFID tag, a short-range wireless beacon (e.g., a Bluetooth beacon), or a matrix barcode, such as Quick Response (QR) code. A camera or a scanner in a user device, such as a mobile device 119B, may scan location identifier 311 using an input device, such as an imaging device including a camera or a scanner, as described above, or other devices such as an NFC sensor, an RFID reader, a short-range wireless transponder (e.g., a Bluetooth transponder), or a keyboard. The scanned information may be sent to WMS 119, which may then determine and confirm whether a picker is at a location that is designated by WMS 119.

Such operation of verifying a picker's location may occur as the picker is retrieving items assigned to him or her in a batch. A batch may include one or more items or item identifiers corresponding to the one or more items. A picker may pick (i.e., retrieving) items included in the assigned batch until every item in the batch is picked. In some embodiments, the picker may move in picking zone 300, such as a warehouse, on foot, while in other embodiments, the picker may use mobility devices that assist movement such as a scooter, a robot and/or vehicles.

In some embodiments, a user device (e.g., mobile device 119B) may assist a picker to find a designated location. In some embodiments, the user device may show the picker a map with directional guidance. For example, the user device may inform a picker to turn left upon reaching a certain location. In some embodiments, the user device may provide a signal, including, but not limited to a map, sound, vibration or text message for assisting pickers to find a designated location. In further embodiments, the user device may also be configured to determine and display an optimized route to pick every item of a batch.

Figure 3B:
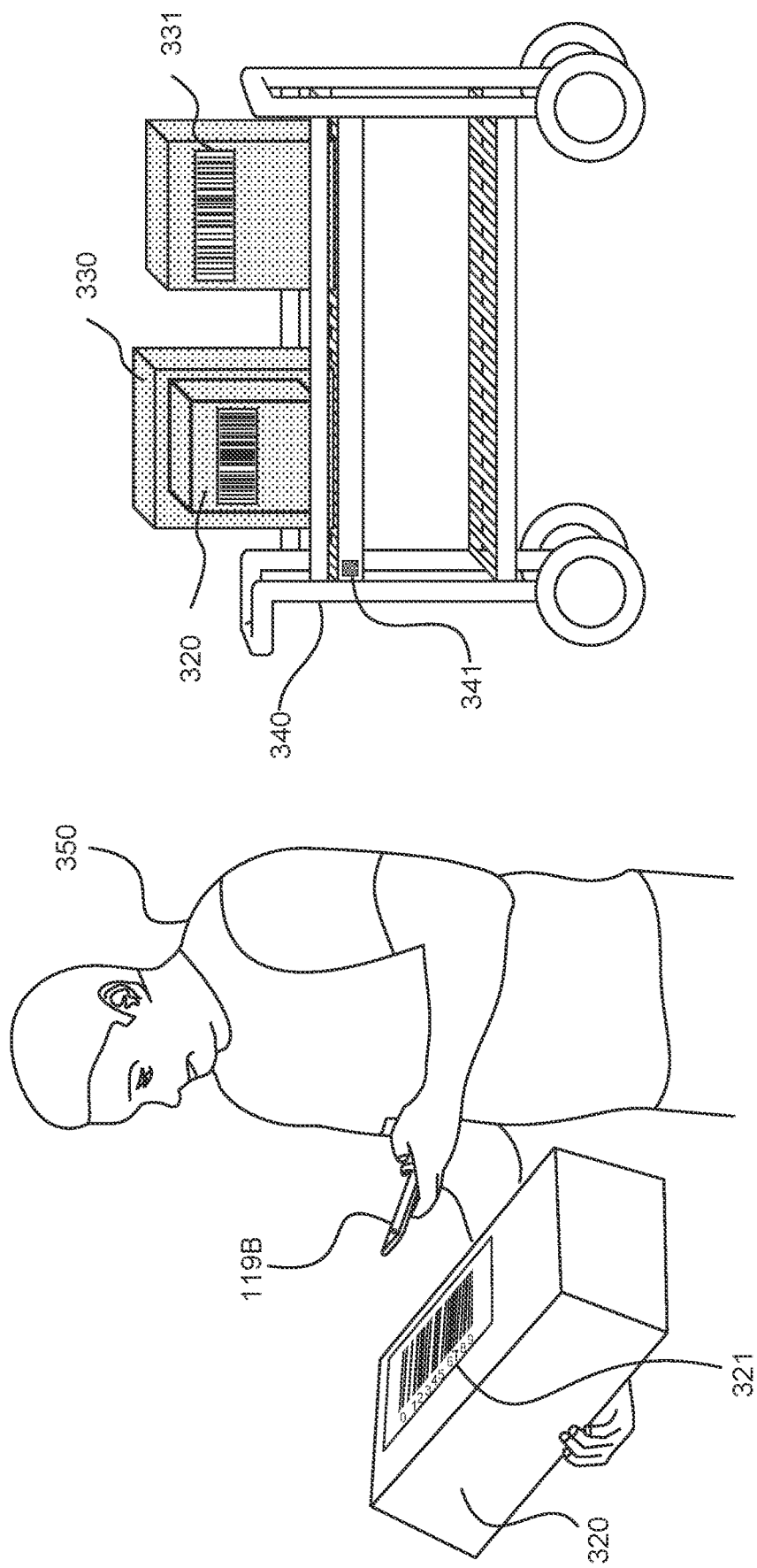
FIG. 3B is a diagrammatic illustration of a picking operation of a worker in picking zone, consistent with the disclosed embodiments.

FIG. 3B is a diagrammatic illustration of a picking operation of a picker 350 in picking zone 300 of FIG. 3A. In some embodiments, each item 320 may have an item identifier 321 attached to item 320. Alternatively, item identifier 321 may be located near item 320. Item identifier 321 may comprise one or more of an item barcode, RFID tag, a matrix barcode, such as Quick Response (QR) code, or the like.

In some embodiments, picker 350 may be able to scan item identifier 321 with an input device of a user device, such as mobile device 119B. The input device may comprise image sensors such as a camera or a scanner, as described above, or other input means such as a keyboard, an NFC sensor, or an RFID reader. The scanned information may be transmitted to WMS 119 via wireless or wired network, which may then confirm whether the scanned item identifier 321 matches item identifier information stored in WMS 119. When WMS 119 confirms that it matches, mobile device 119B may display an instruction for picker 350 to pick item 320 and put it in a container 330. Picker 350 may continue this picking operation until the last item in the batch is picked.

In some embodiments, container 330 may have container identifier 331 attached to container 330. Container identifier 331 may comprise one or more of an item barcode, RFID tag, a matrix barcode, such as Quick Response (QR) code, or the like. Container 330 may include any holding instrument, such as a box, a tote, a bag, or the like, configured to hold one or more items 320. Container 330 may also be a compartment in an automated picking machine. Furthermore, there may be more than one type of container 330 that may vary in size, shape, or material. For example, one type of container 330 may be configured specifically for refrigerated items (e.g., produce, meat) and be constructed of an insulating material, while another type of container 330 may be a simple cardboard box. The types of containers available at FC 200 or at an area (e.g., a particular floor) within picking zone 300 may be different, and a particular type available at one FC or an area may not be available at another.

As the items in a batch are picked, picker 350 may place container 330 on a cart 340. In some embodiments, cart 340 may have a cart identifier 341 attached to cart 340. Cart identifier 341 may comprise one or more of an item barcode, RFID tag, a matrix barcode, such as Quick Response (QR) code, or the like. Cart 340 may be any vehicle configured to hold and transport one or more containers 330, such as a handcart, a dolly, a drivable cart, or the like. In some embodiments, cart 340 may powered by fuel or electricity. In other embodiments, cart 340 may be an automated robot configured to move among storage units 310 and pick items 320 using mechanical instruments such as an articulating arm. As with container 330, the types of carts available at FC 200 or an area within FC 200 may be different, and a particular type available at one FC or an area may not be available at another.

Figure 4:
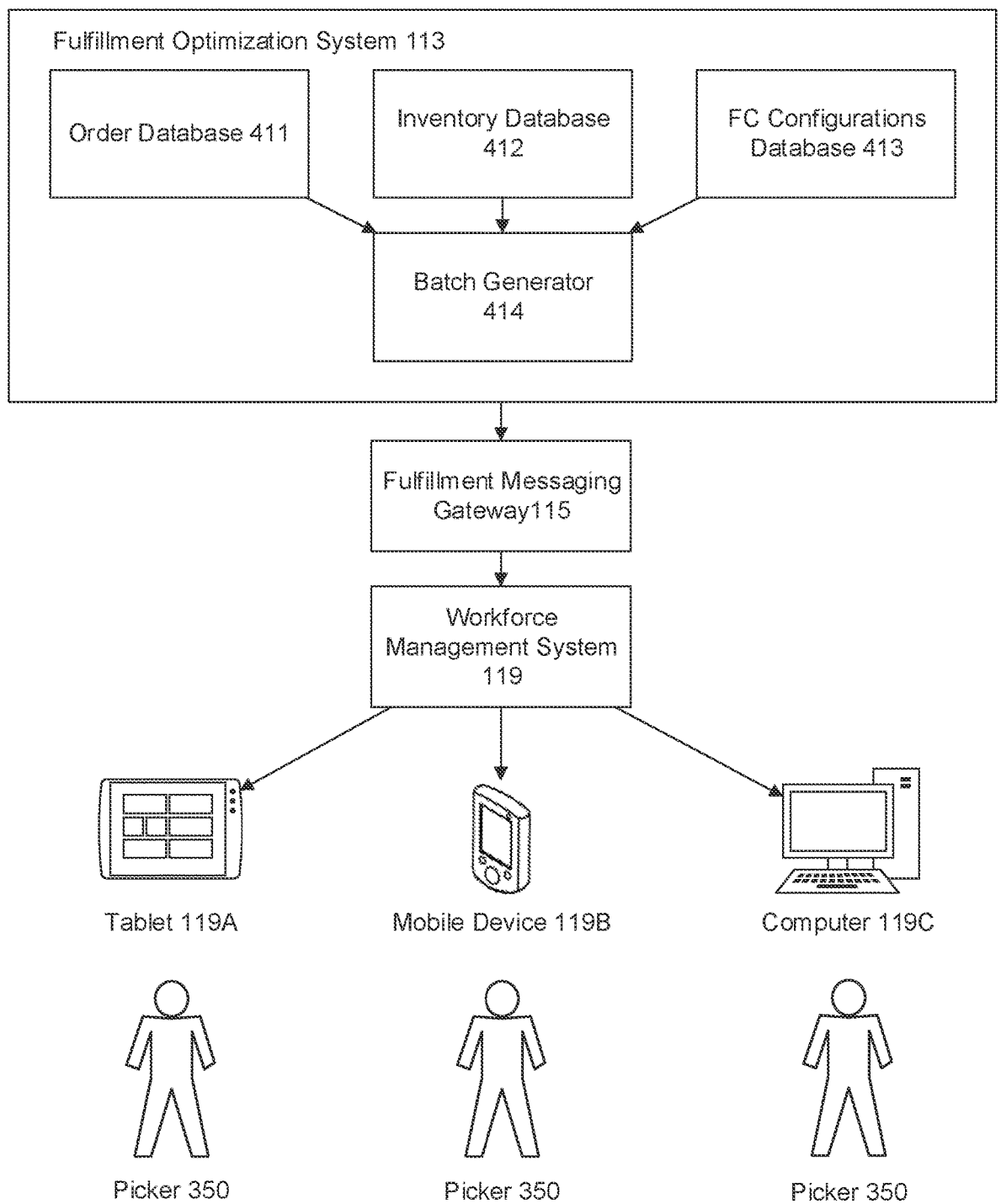
FIG. 4 is a schematic block diagram illustrating an exemplary embodiment of a networked environment comprising computerized systems for on-demand decomposition and distribution of orders to multiple pickers, consistent with the disclosed embodiments.

FIG. 4 is a schematic block diagram illustrating an exemplary embodiment of a networked environment 400 comprising computerized systems for efficient distribution of orders and dissemination of the same to multiple users. Environment 400 may include a variety of systems, each of which may be connected to one another via one or more networks. The systems may also be connected to one another via a direct connection, for example, using a cable. The depicted systems include an FO system 113, a fulfillment messaging gateway (FMG) 115, a workforce management system (WMS) 119, devices 119A-C, and users 350. FMG 115, WMS 119, devices 119A-C, and pickers 350 shown in FIG. 4 correspond to their respective counterparts in FIGS. 1A and 3B and will not be described again here.

FO system 113, on the other hand, is shown in more detail with its component systems. In some embodiments, FO system 113 may comprise an order database 411, an inventory database 412, a FC configurations database 413, and a batch generator 414. Components of FO system 113 (e.g., order database 411, inventory database 412, FC configuration database 413, and batch generator 414) may be implemented as one or more functional units performed by one or more processors based on instructions stored in the one or more memories or portions of one or more non-transitory computer-readable mediums that store information pertaining to each component. Alternatively, components of FO system 113 may be implemented as one or more computer systems communicating with each other via a network. In this embodiment, each of the one or more computer systems may comprise one or more processors, one or more memories (i.e., non-transitory computer-readable media), and one or more input/output (I/O) devices. Each of the one or more computer systems may also take the form of a server, general-purpose computer, a mainframe computer, a special-purpose computing device such as a GPU, laptop, or any combination of these computing devices.

Order database 411, inventory database 412, and FC configuration database 413, in some embodiments, may each be implemented as one or more computer systems that collect, accrue, and/or generate various data accrued from other systems described above. In other embodiments, order database 411, inventory database 412, and FC configuration database 413 may be implemented as a single system of database that store information corresponding to each database in different portions of its storage space (e.g., non-transitory computer-readable medium). In some embodiments, the databases may include cloud-based databases or on-premise databases comprising one or more hard disk drives, one or more solid state drives, or one or more non-transitory memories.

Regardless of the implementation, each component may be dedicated to storing order information, inventory information, and FC configuration information, respectively. More specifically, order database 411 may store order information from external front end system 103 as customers place orders for one or more items in picking zone 209. An order information, for example, may comprise an order identifier, a list of item identifiers ordered by the customer, ordered quantity for each item, customer contact information, payment information, or the like.

Inventory database 412 may store item information of individual items in picking zone 209 of FIG. 2. An item information, for example, may comprise a list of item identifiers grouped by individual FC, their corresponding quantity in stock at respective FC, their location identifiers within respective FC, corresponding item's dimensions, weight, and handling instructions (e.g., fragile, perishable, refrigerated, frozen), or the like. In some embodiments, item information may be updated or generated as items in picking zone 209 are replenished by items received from sellers at inbound zone 203, as they are picked by pickers at picking zone 209, and shipped out to customers from camp zone 215. Various aspects of item information may be updated frequently as individual item identifiers are scanned at different locations within FC 200 and the information are processed by networked systems (e.g., transportation system 107, SOT system 111, WMS 119) as described above with respect to FIG. 1A.

Still further, FC configuration database 413 may store FC configuration information of individual FCs. FC configuration information, for example, may comprise FC specific information comprising available types and numbers of cart 340, available types and numbers of container 330, specifications of transport systems 214 such as weight limit, current number of pickers 350 working at each FC, or the like. In some embodiments, FC configuration information may be collected and updated from time to time as new FCs are built or existing FCs are modified to, for example, add more types and numbers of cart 340 or container 330, or install new transport systems 214.

Batch generator 414, in some embodiments, may include one or more computing devices configured to aggregate order information from order database 411 and distribute them in batches to picker 350 based on item information from inventory database 412 and FC configuration information from FC configurations database 413. In some embodiments, batch generator 414 may further comprise an item pool (not shown) that stores item identifiers and their respective quantities as associated with the orders contained in order information. The functions of batch generator 414 and the item pool are described below in more detail with respect to FIGS. 5-7.

Figure 5:
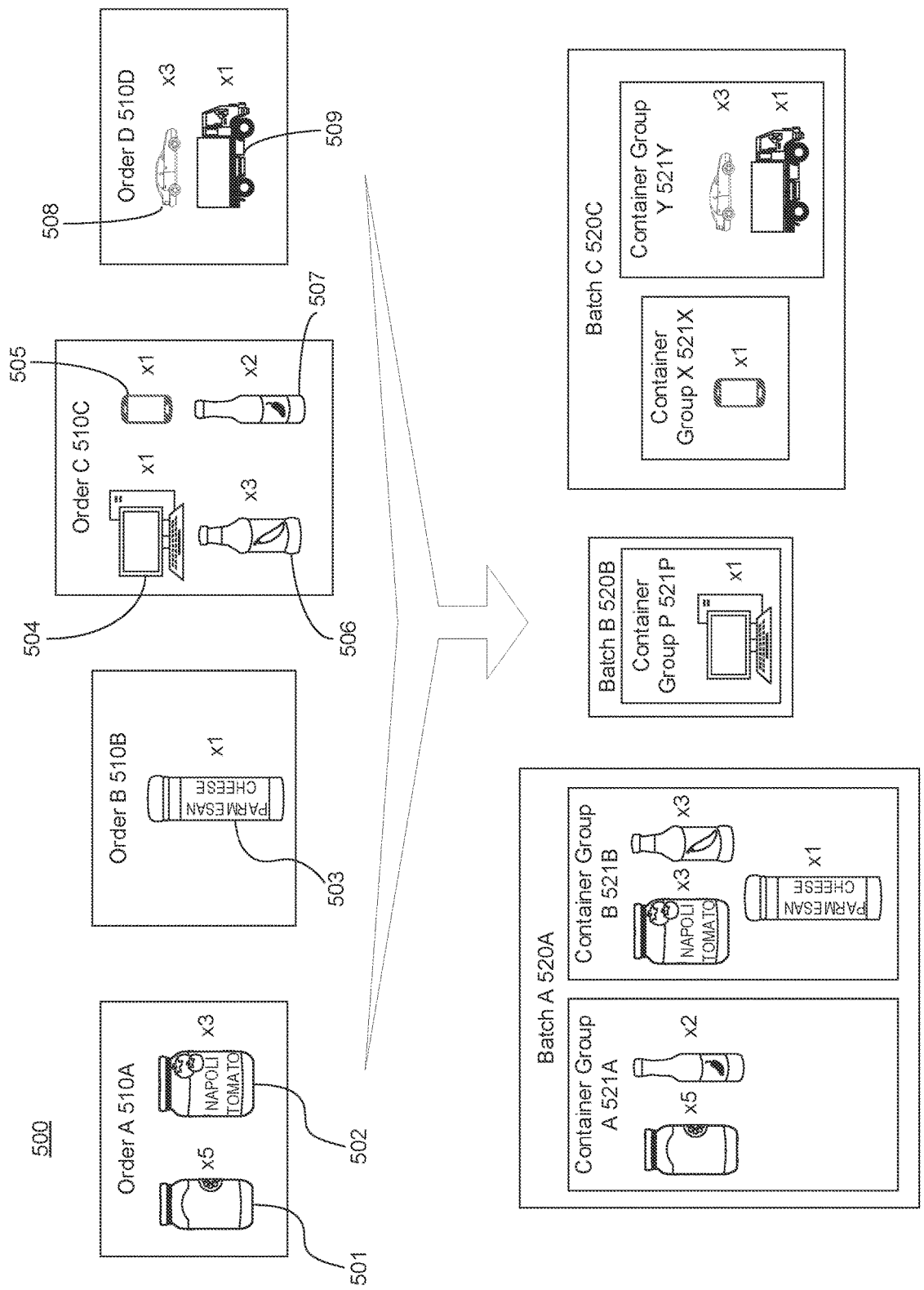
FIG. 5 is an illustration of an exemplary order distribution process, consistent with the disclosed embodiments.

FIG. 5 is an illustration of an exemplary order distribution process 500 that aggregates multiple orders into batches. In this example, order A 510A, order B 510B, order C 510C, and order D 510D may be aggregated by batch generator 414 and distributed into batch A 520A, batch B 520B, and batch C 520C. The number of orders and batches, as well as the items illustrated therein, are only exemplary and batch generator 414 may aggregate any number of orders with any combination of items and distribute them into any number of batches as necessary.

In FIG. 5, order A 510A may comprise item identifiers corresponding to a lemonade 501 and a tomato sauce 502 with quantities of five and three, respectively. Order B 510B may comprise an item identifier corresponding to a grated cheese 504 with a quantity of one. Order C 510C may comprise item identifiers corresponding to a desktop 504, a toy tablet 505, a hot sauce 506, and a chili sauce 507 with quantities of one, one, three, and two, respectively. Order D 510D may comprise item identifiers corresponding to a toy car 508 and a toy truck 509 with quantities of three and one, respectively.

Batch generator 414 may decompose all available orders (e.g., orders A-D 510A-D) into individual item identifiers along with their respective quantity and reorganize them into batches A-C 520A-C based on, for example, their respective location identifier. For example, batch A 520A may contain item identifiers corresponding to location identifiers associated with an area in picking zone 209 that store grocery items. Similarly, batch B 520B and batch C 520C may contain item identifiers corresponding to location identifiers associated with areas in picking zone 209 that store electronics and toys, respectively. In some embodiments, item identifiers from different orders, even if the item identifiers are identical, may be treated as two distinct item identifiers as they are decomposed from the orders so that the quantities of each item identifier for both orders may be counted separately.

In some embodiments, batch generator 414 may generate batches so that each batch contains one or more quantities of only a single item identifier. In further embodiments, batch generator 414 may generate batches using item identifiers of only a subset of available orders that are indicated for priority processing, as is described below with respect to FIG. 7. Still further, batch generator 414 may decompose the available orders into individual item identifiers in advance and store them in the item pool described above, so that the orders do not need to be decomposed every time a batch is generated.

In some embodiments where orders A-D 510A-D contain an amount of items (whether by volume, weight, or quantity) in excess of a predetermined maximum batch size, batch generator 414 may distribute the items into more than one batches. In some embodiments, each batch may be associated with a particular type of cart 340 and the maximum batch size may be determined based on the size of available types of cart 340 or container 330.

Batch generator 414 may further divide item identifiers assigned to a particular batch into one or more container groups. For example, the item identifiers assigned to batch A 520A may further be divided into container group A 521A and container group B 521B; and the item identifiers assigned to batch C 520C may be divided into container group X 521X and container group Y 521Y. Alternatively, all item identifiers of a batch such as batch B 520B may be assigned to a single container group such as container group P 521P.

The decision on whether to split item identifiers of a batch may be based on a number of factors associated with the items corresponding to item identifiers, such as their total weight, total volume, individual shapes, and the like. Batch generator 414 may compare the factors to dimensions, volume capacity, and/or weight capacity of each container and split the item identifiers of a batch into a plurality of container groups when a predetermined maximum container group size is reached. For example, container group A 521 A and container group B 521B may each contain item identifiers for lemonade 501 and chili pepper 507; and tomato sauce 502, hot sauce 506, and grated cheese 503, respectively. In further embodiments where a batch is associated with too many items that a maximum number of container groups for a particular cart associated with the batch is reached, batch generator 414 may create a new batch and associate the excess item identifiers to the new batch. The new batch may similarly be subject to splitting into one or more container groups as described above.

FIG. 6 is a flow chart of an exemplary computerized process 600 for a picking operation as performed by picker 350 with a user device such as mobile device 119B. While the description is made with reference to mobile device 119B below, process 600 may be performed using tablet 119A, computer 119C, or any other personal computing device such as a wearable device, a smartwatch, and augmented reality glasses.

At step 601, mobile device 119B may generate a request for a batch in response to a user input by a picker. As defined above and used herein with respect to FIGS. 6 and 7, a batch may refer to a combination of one or more item identifiers and their respective quantities prescribed in corresponding customer orders, where each item identifier may be associated with an item located in picking zone 209.

In some embodiments, the request generated at step 601 may contain picker-specific information such as current location of mobile device 119B (which corresponds to the current location of the picker that's operating mobile device 119B), container identifier of the container that the picker will use to pick the items, location identifier of the last item picked by the picker, and the time elapsed from picking the last item. These picker-specific information may be chosen from a set of predetermined values retrieved from FC configurations database 413, determined based on user preference specified by the picker, or retrieved from event data stored in WMS 119.

Additionally or alternatively, the current location of mobile device 119B may be generated by a location sensor of mobile device 119B. The location sensor may comprise any device configured to identify a spatial location within an area such as a GPS, a short-range wireless transponder (e.g., a Bluetooth transponder), an NFC reader, or an RFID reader.

In further embodiments, mobile device 119B may transmit the request to FO system 113, which triggers batch generator 414 to generate a batch with a corresponding batch identifier and return the batch identifier. The batch identifier may correspond to the batch specifically generated in response to the request, where the batch may contain a combination of item identifiers pulled from available orders and their respective quantity as described above. Transmitting and receiving batch identifiers instead of data expressing the batches themselves may allow networked environment 400 to minimize network traffic among different systems, thereby increasing overall processing speed and improving scalability.

At step 602, mobile device 119B may receive a batch identifier from batch generator 414. In some embodiments, batch generator 414 or mobile device 119B may update an appropriate record (e.g., event data in WMS 119) to indicate that the current batch corresponding to the received batch identifier is assigned to the picker operating mobile device 119B.

At step 603, mobile device 119B (and thus the picker using mobile device 119B) may initiate a picking operation for the current batch. In some embodiments, a picking operation may include retrieving one or more items corresponding to item identifiers contained in the current batch, as described above.

In further embodiments, mobile device 119B may be configured to display locations of items on mobile device 119B relative to the current location determined at step 601 or the instantaneous location of mobile device 119B. Additionally or alternatively, mobile device 119B may further be configured to display a directional guidance to each item. Mobile device 119B may also comprise an augmented reality display that overlays the directional guidance and visual indicators of the associated items' locations within picking zone 209 and/or storage units 310. In some embodiments, the augmented reality display may take the form of glasses, goggles, a headgear, a helmet, contact lenses, or any other device configured to place a display within the picker's field of view.

At step 604, once the picker has located a particular item, mobile device 119B may scan the item identifier of the item to confirm and log that the item in the current batch is picked. In some embodiments, scanning the item identifier may comprise receiving input data corresponding to the item identifier that is generated in response to reading or scanning the item identifier on the item as described above.

At step 605, after each item identifier is scanned, indicating that the corresponding item is placed in a container by the picker, mobile device 119B may determine whether the container is full. In some embodiments, mobile device 119B may determine that the container is full when the total volume or total weight of items currently placed in the container meets or exceeds a predetermined percentage of maximum volume capacity or maximum weight capacity of the container as specified in the picker-specific information or FC configurations database 413. This predetermined percentage may be referred to as "fill rate." Some containers may specify different values to define the volume fill rate and weight fill rate. In other embodiments, other systems such as FO system 113 or WMS 119 may monitor and track whether the containers being used by pickers are full and notify the corresponding picker via his or her mobile device 119B. Still further, the container itself may be configured to monitor its contents to determine when the items placed therein exceed or meet its maximum capacity and notify the picker using an output device integrated thereon (e.g., speaker, LED, piezoelectric driver) or via his or her mobile device 119B. Additionally or alternatively, the picker may determine that the container is full and input a signal as such.

Mobile device 119B may repeat steps 604 and 605 until the container is full (whether through automatic or manual determination described above) or all items of the current batch are picked, whichever occurs earlier.

While batches are generated based on specifications of the container as relayed with the request at step 601, there may be occasions where the picker is unable to fit all items of the current batch in the container. Such occasions may arise, for example, when the items are placed irregularly in the container or when items are unusually shaped and does not fit neatly in container 330. Mobile device 119B may determine whether such occasion has occurred at step 606, where mobile device 119B may compare the items picked and placed in the container against the items of the current batch. Mobile device 119B may return any items not picked through steps 604 and 605 to batch generator 414, at step 607, to be included in future batches.

Once all items of the current batch are picked or any non-picked items are returned, mobile device 119B may determine, at step 608, that the picking operation is complete. Additionally or alternatively, mobile device 119B may update the record in WMS 119 to indicate that the current batch is completed. In further embodiments, mobile device 119B may also generate and transmit a signal to FO system 113 to begin transporting the picked items to, e.g., packing zone 211 for further packaging and delivery to respective customers.

FIG. 7 is a flow chart of an exemplary computerized process 700 for generating a batch on-demand in response to a request from mobile device 119B. In some embodiments, process 700 may be performed by FO system 113, or in particular, batch generator 414. Furthermore, while the description is made with reference to mobile device 119B below, process 700 may be performed in communication with tablet 119A, computer 119C, or any other personal computing device such as a wearable device, a smartwatch, or augmented reality glasses that generated the request at step 601 described above.

At step 701, batch generator 414 may receive a request for a batch from mobile device 119B. In some embodiments, the request may comprise picker-specific information as described above, while in other embodiments, batch generator 414 may retrieve such picker-specific information from network connected systems such as FC configurations database 413 or WMS 119 based on an identity of the device that sent the request.

At step 702, batch generator 414 may obtain item identifiers and their respective quantity per order to generate a batch. In some embodiments, obtaining the item identifiers and their respective quantity may comprise retrieving them as stored in the item pool described above. In other embodiments, obtaining the item identifiers and their respective quantity may comprise decomposing available orders into individual item identifiers in response to the request.

Next, batch generator 414 may perform steps 711-713 of block 710 for each item identifier obtained in step 702. At step 711, batch generator 414 may determine the priority group of a current item identifier based on the order that it is associated with. In some embodiments, batch generator 414 may determine that an item identifier belongs to a particular priority group based on, for example, membership privileges of the customer that placed the order, status of the order (e.g., return, expedited, same-day), and/or the period of time remaining before the associated order must be packaged and shipped out to the customer. For example, item identifiers associated with orders that must be shipped out within an hour may be determined to be priority group 1, those associated with orders to ship out within two hours priority group 2, and so on. The periods of time and number of priority groups used herein are only exemplary and any other periods or intervals of time and number of priority groups may be used.

In some embodiments, each item identifier may be associated with a normalized volume and/or a normalized weight, which indicates a percentage of a container that the corresponding item will occupy per unit of distance traveled by a picker. For example, an item having a normalized volume of 10 indicates that the item will occupy 10% of the current container (specified by the request received at step 701) per unit of distance traveled by the picker. Such item may be, for example, an item that will occupy 30% of the current container and is 3 units of distance away from the picker, or an item that will occupy 10% of the current container but is 1 unit of distance away. This allows batch generator 414 to compare all items against a common metric with which it may assign different combinations of item identifiers to a batch that maximizes efficiency and throughput of the order fulfillment process. Batch generator 414 may recalculate the normalized volume and the normalized weight of an item for each request based on the container specified by the request.

At step 712, batch generator 414 may retrieve an urgency multiplier corresponding to the determined priority group. In some embodiments, the urgency multiplier may be any decimal greater than 0 and less than 1 or any equivalent percentage. There may be also separate urgency multipliers for the normalized volume and the normalized weight. The value of the urgency multipliers may increase as the priority of the priority groups decrease, where, for example, the urgency multiplier corresponding to priority group 1 may be 50% while the urgency multiplier for priority group 2 may be 75%.

At step 713, batch generator 414 may apply the urgency multiplier to the normalized volume and the normalized weight of the current item identifier. Applying the urgency multiplier may involve multiplying or dividing the normalized volume and weight by the urgency multiplier, thereby adjusting the normalized volume and weight based on the priority group. The adjusted normalized volume and weight may allow batch generator 414 to generate the batch candidates later at step 703 with priority to the items that must be delivered soon.

In some embodiments, batch generator 414 may apply the priority group urgency multiplier and the batch creation multiplier on only a subset of the item identifiers obtained that belong to a particular priority group. For example, batch generator 414 may perform steps 712 and 713 only on item identifiers belonging to priority group 1 or the group with the highest priority. In other embodiments, batch generator 414 may combine steps 702 and 711 by determining the priority groups of item identifiers while obtaining them at step 702, and discarding those that do not belong to a particular priority group. Batch generator 414 may then perform steps 712 and 713 to all item identifiers that remain.

At step 703, batch generator 414 may create combinations of item identifiers as batch candidates. Each batch candidate may comprise any number of item identifiers and their quantities, whose normalized volumes or normalized weights add up to fill the current container. A batch candidate may be considered to fill the current container when either the sum of normalized volumes or the sum of normalized weights of its items is just below 100% of the volume or weight capacity of the current container or just above its volume or weight fill rate. In some embodiments, batch generator 414 may create the batch candidates using only the item identifiers of a particular priority group such as priority group 1 or the group with the highest priority.

Next, batch generator 414 may perform steps 721-724 of block 720 for each batch candidate. At step 721, batch generator 414 may confirm that the current batch candidate meets the volume or weight fill rate specified by the request at step 701 above. Any batch candidate that does not may be removed at step 722. In some embodiments, batch candidates that exceed the maximum capacity (i.e., 100% of the current container by volume or weight) may also be removed.

In some embodiments, batch generator 414 then may determine a scores for the batch candidate that meets the fill rate threshold using the formula below. The formula is only exemplary and other suitable formulas for determining a score or variations of the formula (e.g., with different coefficients or constants) may be used.

$$\text{score} = \frac{\left(\begin{array}{c}\text{greater of}\\\text{the total normalized volume}\\\text{or total normalized weight}\end{array}\right) + \left(\frac{\begin{array}{c}\text{smaller of}\\\text{the total normalized volume}\\\text{or total normalized weight}\end{array}}{10}\right)}{\text{total distantance to be traveled} + 10}$$

At step 723, batch generator 414 may determine the elapsed time from the last known location of picker. In some embodiments, the last known location may correspond to the location of the item in picking zone 209 that the picker retrieved. In further embodiments, the last known location may correspond to the current location of mobile device 119B received with the request at step 701, or it may be determined from event data stored in WMS 119.

At step 724, batch generator 414 may apply a recent picker weight to the current batch candidate based on the last known location and the elapsed time. In some embodiments, applying the recent picker weight may refer to adding the recent picker weight to the batch candidate's score. The recent picker weight may refer to a numerical value representing how much preference the current batch candidate should be given based on the proximity of the last known location and the locations of the items associated with the current batch candidate. In some embodiments, the recent picker weight may be proportional to the units of distance picker must travel from the last known location in order to pick every item of the current batch candidate. In other embodiments, the recent picker weight may be proportional to the units of distance between the last known location and the center of gravity of the items in the current batch candidate.

Furthermore, batch generator 414 may apply only a portion of the recent picker weight as adjusted based on the elapsed time from the last known location. The less time has elapsed since a picker's last known location, the more likely it is for a picker to be in the vicinity of that last known location. Therefore, applying higher recent picker weights to batch candidates associated with items closer to the picker's last known location based on the elapsed time may allow batch generator 414 to give an appropriate amount consideration to the picker's last known location. For example, batch generator 414 may apply 100% of the recent picker weight if the elapsed time is less than 1 minute, apply a proportional amount of the recent picker weight if the elapsed time is between 1 and 15 minutes, or apply 0% if the elapsed time is greater than 15 minutes. The percentages and the ranges of elapsed time described herein are only exemplary and other percentages and ranges of time may be used to adjust the recent picker weight.

At step 704, batch generator 414 may identify the batch candidate with the highest score based on the score determined at step 721 and the recent picker weight applied at step 724.

At step 705, batch generator 414 may transmit the batch identifier of the batch candidate with the highest score to mobile device 119B. Mobile device 119B may then receive the batch identifier at step 602 of FIG. 6 and perform the rest of process 600 as described above. When there are more than one batch candidates with the highest score, batch generator 414 may transmit the batch identifier of the batch candidate with the greatest or the smallest number of items as appropriate.

In some embodiments, the batch identifier, the item identifiers included therein, and the identity of mobile device 119B that received the batch identifier may be recorded in a storage device (not shown) of FO system 113 or WMS 119. Mobile device 119B may be configured to retrieve the item identifiers from this storage device upon receiving the batch identifier at step 602.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for handling item identifiers, the system comprising:
   a memory storing instructions; and
   at least one processor configured to execute the instructions for:
   receiving parameters including a current location and a current container;
   generating a combination of a plurality of item identifiers based on the current location, the current container, and a first area, wherein a plurality of items associated with the plurality of item identifiers is contained within the first area;
   transmitting a request for the combination of the plurality of item identifiers; and
   processing the plurality of items until a threshold capacity of the current container is reached or each item of the combination of the plurality of items is processed by receiving input data corresponding to the plurality of item identifiers.

2. The computer-implemented system of claim 1, wherein the plurality of item identifiers is further associated with one or more orders for the plurality of items.

3. The computer-implemented system of claim 1, wherein the current location is retrieved from a location sensor comprising at least one of a GPS, a short-range wireless beacon, an NFC reader, or an RFID reader.

4. The computer-implemented system of claim 1, wherein the current location is determined based on a location of a last item previously collected by a user.

5. The computer-implemented system of claim 1, wherein the threshold capacity is a predetermined percentage of a maximum volume capacity of the current container or a maximum weight capacity of the current container.

6. The computer-implemented system of claim 1, wherein the instructions further comprise displaying locations of the plurality of items relative to the current location.

7. The computer-implemented system of claim 1, wherein receiving the parameters comprises capturing the plurality of item identifiers using at least one of an image sensor, an NFC sensor, or a keyboard.

8. The computer-implemented system of claim 1, wherein processing the plurality of items further comprises comparing a sum of weights of a subset of the plurality of items corresponding to the received input data against the threshold capacity.

9. The computer-implemented system of claim 1, wherein the instructions further comprise transmitting a subset of the plurality of item identifiers associated with a subset of the plurality of items over the threshold capacity.

10. The computer-implemented system of claim 1, wherein the instructions further comprise transmitting a signal to trigger a transportation of the plurality of items to a second area.

11. A computer-implemented method for handling item identifiers, the method comprising:
    receiving parameters including a current location and a current container;
    generating a combination of a plurality of item identifiers based on the current location, the current container, and a first area, wherein a plurality of items associated with the plurality of item identifiers is contained within the first area;
    transmitting a request for the combination of the plurality of item identifiers; and
    processing the plurality of items until a threshold capacity of the current container is reached or each item of the combination of the plurality of items is processed by receiving input data corresponding to the plurality of item identifiers.

12. The computer-implemented method of claim 11, wherein the plurality of item identifiers is further associated with one or more orders for the plurality of items.

13. The computer-implemented method of claim 11, wherein the current location is retrieved from a location sensor comprising at least one of a GPS, a short-range wireless beacon, an NFC reader, or an RFID reader.

14. The computer-implemented method of claim 11, wherein the current location is determined based on a location of a last item previously collected by a user.

15. The computer-implemented method of claim 11, wherein the threshold capacity is a predetermined percentage of a maximum volume capacity of the current container or a maximum weight capacity of the current container.

16. The computer-implemented method of claim 11, further comprising displaying locations of the plurality of items relative to the current location.

17. The computer-implemented method of claim 11, wherein receiving the parameters comprises capturing the plurality of item identifiers using at least one of an image sensor, an NFC sensor, or a keyboard.

18. The computer-implemented method of claim 11, wherein processing the plurality of items further comprises comparing a sum of weights of a subset of the plurality of items corresponding to the received input data against the threshold capacity.

19. The computer-implemented method of claim 11, further comprising transmitting a subset of the plurality of item identifiers associated with a subset of the plurality of items over the threshold capacity.

20. The computer-implemented method of claim 11, further comprising transmitting a signal to trigger a transportation of the plurality of items to a second area.

* * * * *